(12) United States Patent
Leinonen et al.

(10) Patent No.: US 10,701,731 B2
(45) Date of Patent: Jun. 30, 2020

(54) DETERMINING WHETHER TO TRANSMIT DATA ON A CANDIDATE RADIO CHANNEL

(71) Applicant: Telefonaktiebolaget LM Ericsson (publ), Stockholm (SE)

(72) Inventors: Marko E. Leinonen, Haukipudas (FI); Kauko Heinikoski, Oulu (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/078,258

(22) PCT Filed: Mar. 23, 2016

(86) PCT No.: PCT/SE2016/050237
§ 371 (c)(1),
(2) Date: Aug. 21, 2018

(87) PCT Pub. No.: WO2017/164780
PCT Pub. Date: Sep. 28, 2017

(65) Prior Publication Data
US 2019/0053277 A1    Feb. 14, 2019

(51) Int. Cl.
*H04W 74/08* (2009.01)
*H04W 24/10* (2009.01)
*H04W 16/14* (2009.01)

(52) U.S. Cl.
CPC ....... *H04W 74/0808* (2013.01); *H04W 24/10* (2013.01); *H04W 16/14* (2013.01)

(58) Field of Classification Search
None
See application file for complete search history.

(56) References Cited

U.S. PATENT DOCUMENTS 6,487,399 B1 * 11/2002 Rajaniemi ............. H04W 48/18
370/335
2008/0146156 A1    6/2008 Makhlouf et al.
(Continued)

FOREIGN PATENT DOCUMENTS

WO        2015 068345 A1    5/2015
WO     WO-2015068345 A1 *   5/2015

OTHER PUBLICATIONS

3GPP TR 36.889 v13.0.0; Technical Report; 3rd Generation Partnership Project; Technical—Specification Group Radio Access Network; Study on Licensed-Assisted Access to Unlicensed Spectrum; (Release 13)—Jun. 2015.
(Continued)

*Primary Examiner* — Kodzovi Acolatse
*Assistant Examiner* — The Hy Nguyen
(74) *Attorney, Agent, or Firm* — Baker Botts, LLP

(57) ABSTRACT

It is presented a method for determining whether to initiate transmission of data on a candidate radio channel during a candidate period. The method is performed in a transceiver device and comprises the steps of: obtaining a first signal metric indicating a signal level of the candidate radio channel; determining that the first signal metric indicates a signal level being greater than a first threshold; obtaining a second signal metric indicating a signal level of at least one adjacent radio channel, being adjacent in frequency to the candidate radio channel; refraining from initiating transmission on the candidate radio channel in the candidate period when the second signal metric indicates a lower signal level than the first signal metric; and initiating transmission of data on the candidate radio channel in the candidate period when the second signal metric indicates a higher signal level than the first signal metric.

18 Claims, 4 Drawing Sheets

(56) References Cited

U.S. PATENT DOCUMENTS

| | | | |
|---|---|---|---|
| 2013/0102340 A1* | 4/2013 | Lien | H04W 48/16 455/501 |
| 2014/0105153 A1* | 4/2014 | Jung | H04W 72/085 370/329 |
| 2016/0081031 A1* | 3/2016 | Barriac | H04W 52/0261 370/311 |
| 2016/0242031 A1* | 8/2016 | Ojanen | H04W 28/16 |
| 2016/0249391 A1* | 8/2016 | Kim | H04W 16/14 |
| 2017/0353857 A1* | 12/2017 | Ojanen | H04W 76/11 |
| 2018/0103458 A1* | 4/2018 | Tooher | H04W 16/14 |

OTHER PUBLICATIONS

LAA-LTE LBT TA Study; Ericsson Internal; Author: Goran Andrijevic—Feb. 18, 2015.
3GPP TSG RAN WG1 meeting #82; Beijing, China; Source: MediaTek Inc.; Title: LBT design for Licensed Assisted Access; Agenda Item: 7.2.4.1 (R1-154650)—Aug. 24-28, 2015.
PCT International Search Report for International application No. PCT/SE2016/050237—dated Nov. 23, 2016.
PCT Written Opinion of the Intenrational Searching Authority for International application No. PCT/SE2016/050237—dated Nov. 23, 2016.

* cited by examiner

DETERMINING WHETHER TO TRANSMIT DATA ON A CANDIDATE RADIO CHANNEL

PRIORITY

This nonprovisional application is a U.S. National Stage Filing under 35 U.S.C. § 371 of International Patent Application Serial No. PCT/SE2016/050237 filed Mar. 23, 2016 and entitled "DETERMINING WHETHER TO TRANSMIT DATA ON A CANDIDATE RADIO CHANNEL" which is hereby incorporated by reference in its entirety.

TECHNICAL FIELD

The invention relates to a method, network nodes, a computer program and a computer program product for determining whether to transmit data on a candidate radio channel during a candidate period.

BACKGROUND

In telecommunication, a new technology called LTE-U (Long Term Evolution in Unlicensed) is being developed, where an LTE system can be applied to other frequencies than previously standardised in 3GPP ($3^{rd}$ Generation Partnership Project) standards.

3GPP is working to finalize release 13 LTE LAA (Licence Assisted Access) standard based on LTE-U. The LTE LAA system will require listen before talk functionality prior a transmission. The 3GPP standard version release 14 will include duplex operation, where both transmission and reception will occur at the unlicensed frequency band. For instance, LTE-U can be deployed to use the 5 GHz band, which is currently used mostly for WiFi. LTE-U can be used to deploy LTE as Supplemental Downlink (SDL), with the PCell (Primary Cell) always operating on a carrier in a licensed band.

In such an environment, listen before talk (LBT) is utilised to reduce the risk of transmitters from different (or the same) radio access technologies transmitting on the same radio channel at the same time. However, the LBT procedure is sometimes inefficient in terms of throughput.

SUMMARY

It is an object to provide a way of improving throughput in a listen before talk environment.

According to a first aspect, it is provided a method for determining whether to initiate transmission of data on a candidate radio channel during a candidate period. The method is performed in a transceiver device of a cellular network and comprises the steps of: obtaining a first signal metric indicating a signal level of the candidate radio channel; determining that the first signal metric indicates a signal level being greater than a first threshold; obtaining a second signal metric indicating a signal level of at least one adjacent radio channel, being adjacent in frequency to the candidate radio channel; refraining from initiating transmission on the candidate radio channel in the candidate period when the second signal metric indicates a lower signal level than the first signal metric; and initiating transmission of data on the candidate radio channel in the candidate period when the second signal metric indicates a higher signal level than the first signal metric.

The step of initiating transmission may comprise initiating transmission of data on the candidate radio channel in the candidate period only when the first signal metric indicates a signal level being lower than a second threshold.

The method may further comprise the step of: adjusting the first threshold over time based on changing signal levels.

The step of adjusting may further comprise adjusting the second threshold over time based on changing signal levels.

The step of adjusting may further comprise adjusting based on detecting details of a radio access technology used for transmission on the at least one adjacent radio channel.

The step of obtaining a second signal metric may further comprise obtaining the second signal metric indicating a signal level of a two adjacent radio channels being adjacent in frequency on either side of the candidate radio channel.

The radio channel may be a radio channel according to LTE-U, Long Term Evolution Licence Assisted Access, LTE-LAA, as defined in 3GPP Release 13.

Each one of the first signal metric and the second signal metric may be an average of several individual measurements.

The step of obtaining a first signal metric and the step of obtaining a second signal metric may be based on measurements performed at the same time.

According to a second aspect, it is provided a transceiver device for determining whether to initiate transmission of data on a candidate radio channel during a candidate period. The transceiver device is arranged to form part of a cellular network and comprising: a processor; and a memory storing instructions that, when executed by the processor, causes the transceiver device to: obtain a first signal metric indicating a signal level of the candidate radio channel; determine that the first signal metric indicates a signal level being greater than a first threshold; obtain a second signal metric indicating a signal level of at least one adjacent radio channel, being adjacent in frequency to the candidate radio channel; refrain from initiating transmission on the candidate radio channel in the candidate period when the second signal metric indicates a lower signal level than the first signal metric; and initiate transmission of data on the candidate radio channel in the candidate period when the second signal metric indicates a higher signal level than the first signal metric.

The instructions to initiate transmission may comprise instructions that, when executed by the processor, causes the transceiver device to initiate transmission of data on the candidate radio channel in the candidate period only when the first signal metric indicates a signal level being lower than a second threshold.

The transceiver device may further comprise instructions that, when executed by the processor, causes the transceiver device to: adjust the first threshold over time based on changing signal levels.

The instructions to adjust may further comprise instructions that, when executed by the processor, causes the transceiver device to adjust the second threshold over time based on changing signal levels.

The instructions to adjust may further comprise instructions that, when executed by the processor, causes the transceiver device to adjust based on detecting details of a radio access technology used for transmission on the at least one adjacent radio channel.

The instructions to obtain a second signal metric may further comprise instructions that, when executed by the processor, causes the transceiver device to obtain the second signal metric indicating a signal level of a two adjacent radio channels being adjacent in frequency on either side of the candidate radio channel.

The radio channel may be a radio channel according to Long Term Evolution Licence Assisted Access, LTE-LAA, as defined in 3GPP Release 13.

Each one of the first signal metric and the second signal metric may be an average of several individual measurements.

The transceiver device may further comprise instructions to perform the instructions to obtain a first signal metric and to obtain a second signal metric at the same time.

According to a third aspect, it is provided a transceiver device comprising: means for obtaining a first signal metric indicating a signal level of a candidate radio channel; means for determining that the first signal metric indicates a signal level being greater than a first threshold; means for obtaining a second signal metric indicating a signal level of at least one adjacent radio channel, being adjacent in frequency to the candidate radio channel; means for refraining from initiating transmission on the candidate radio channel in a candidate period when the second signal metric indicates a lower signal level than the first signal metric; and means for initiating transmission of data on the candidate radio channel in the candidate period when the second signal metric indicates a higher signal level than the first signal metric.

According to a fourth aspect, it is provided a computer program for determining whether to initiate transmission of data on a candidate radio channel during a candidate period. The computer program comprises computer program code which, when run on a transceiver device being part of a cellular network causes the transceiver device to: obtain a first signal metric indicating a signal level of the candidate radio channel; determine that the first signal metric indicates a signal level being greater than a first threshold; obtain a second signal metric indicating a signal level of at least one adjacent radio channel, being adjacent in frequency to the candidate radio channel; refrain from initiating transmission on the candidate radio channel in the candidate period when the second signal metric indicates a lower signal level than the first signal metric; and initiating transmission of data on the candidate radio channel in the candidate period when the second signal metric indicates a higher signal level than the first signal metric.

According to a fifth aspect, it is provided a computer program product comprising a computer program according to the fourth aspect and a computer readable means on which the computer program is stored.

Here now follows a set of definition to be used for construing the mentioned terms.

Candidate radio channel is to be construed as the radio channel intended to be used for transmissions Candidate period is to be construed as the time period in which the network node intends to transmit data on the candidate radio channel unless the candidate radio channel is occupied for other transmissions.

Transceiver device is to be construed as a device which controls transmission and reception. The transceiver device can perform the actual transmission and/or reception itself or using devices controlled by the transceiver device. For instance, the transceiver device can be a network node (such as a radio base station) or a wireless device.

First signal metric is to be construed as a metric indicating a signal level on the candidate radio channel.

Second signal metric is to be construed as a metric indicating a signal level on one or two radio channels being adjacent to the candidate radio channel.

First threshold is to be construed as signal threshold defining when the radio channel is indicated to be free. It is set such that when first signal metric is under the first threshold, the candidate radio channel is considered unoccupied and free for transmissions.

Second threshold is to be construed as signal threshold defining when the signal level is too high on the radio channel even when there are higher signal levels on an adjacent radio channel.

Radio channel is to be construed as a frequency interval used for radio transmissions. The radio channel is defined for Long Term Evolution Licence Assisted Access (LTE-LAA) but often coincides with radio channels defined for IEEE 802.11x.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments presented herein are applicable in a listen to talk scenario where the signal levels of the radio environment is analysed prior to transmission to reduce the risk of concurrent transmissions on the same radio channel. Signal levels are herein not only obtained for the candidate radio channel, on which transmissions are intended, but also for at least one adjacent radio channel. When an adjacent radio channel has a greater signal level than the candidate radio channel, the transceiver device can still initiate transmit even if the signal on the candidate level is greater than a base threshold, since the signal on the candidate radio channel is considered to be a side component of a main transmission on the adjacent radio channel. By allowing such transmissions, throughput is greatly increased in a listen to talk environment.

Figure 1:
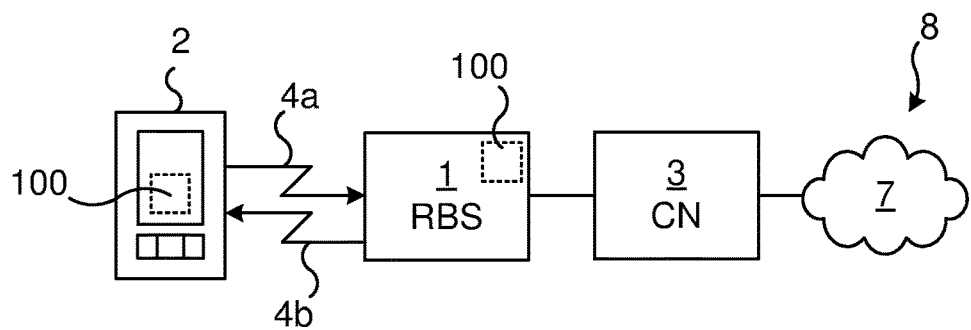
FIG. 1 is a schematic diagram illustrating a cellular communication network 8 where embodiments presented herein may be applied.

FIG. 1 is a schematic diagram illustrating a cellular communication network 8 where embodiments presented herein may be applied. The cellular communication network 8 comprises a core network 3 and one or more network nodes 1, here in the form of radio base stations being evolved Node Bs, also known as eNode Bs or eNBs. The network node is also referred to as a radio base station (RBS) herein. The network node 1 could also be in the form of Node Bs, BTSs (Base Transceiver Stations) and/or BSSs (Base Station Subsystems), etc. The network node 1 provides radio connectivity over a wireless interface 4*a*-*b* to a plurality of wireless devices 2. The term wireless device is also known as mobile communication terminal, user equipment (UE), mobile terminal, user terminal, user agent, wireless terminal, machine-to-machine device etc., and can be, for example, what today are commonly known as a mobile phone or a tablet/laptop with wireless connectivity. The term wireless is here to be construed as having the ability to perform wireless communication. More specifically, the wireless device 2 can comprise a number of wires for internal and/or external purposes. The wireless device 2 is also referred to as a UE herein.

The cellular communication network 8 may e.g. comply with any one or a combination of LTE (Long Term Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), WiFi or 802.11 standard, MuLTEfire (standalone LTE network at un-licensed band without primary cell) or any other current or future wireless network, such as LTE-Advanced, as long as the principles described hereinafter are applicable.

Over the wireless interface, uplink (UL) communication 4*a* occurs from the wireless device 2 to the network node 1 and downlink (DL) communication 4*b* occurs from the network node 1 to the wireless device 2. The quality of the wireless radio interface to each wireless device 2 can vary over time and depending on the position of the wireless device 2, due to effects such as fading, multipath propagation, interference, etc.

The network node 1 is also connected to the core network 3 for connectivity to central functions and a wide area network 7, such as the Internet.

The network node 1 comprises a transceiver device 100. The transceiver device 100 is a device which controls transmission and reception and may share resources with the network node 1.

Moreover, the wireless device 2 comprises its own transceiver device 100. The transceiver device 100 is a device which controls transmission and reception and may share resources with the wireless device 2.

Figure 2:
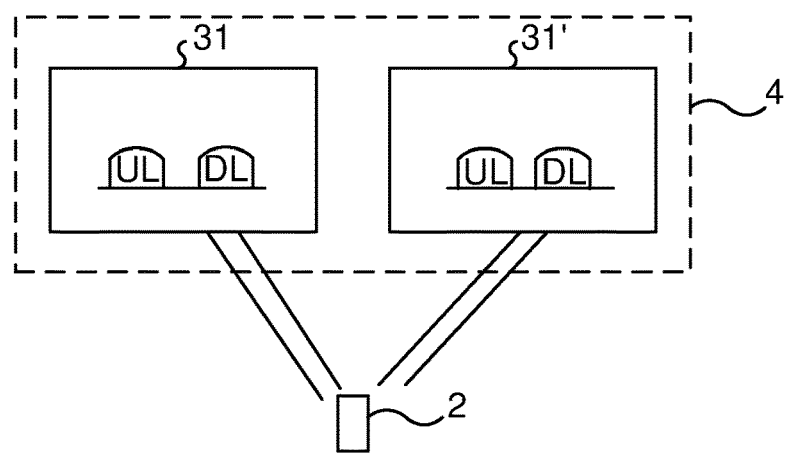
FIG. 2 is a schematic diagram illustrating an environment in which embodiments presented herein can be deployed.

FIG. 2 is a schematic diagram illustrating an environment in which embodiments presented herein can be deployed. The wireless interface, also known as the air interface, for LTE-U (LTE Unlicensed) is shown in FIG. 2. The wireless device, also known as mobile terminal (UE), 2 is connected to LTE network via wireless interface 4 comprising two air interfaces: the primary carrier 31 which is in a (licensed) 3GPP frequency band and the secondary carrier 31' which is in an unlicensed frequency band for example (ISM (Industrial, Scientific and Medical) band). The primary carrier 31 may utilise LTE FDD (Frequency Division Duplex) and/or TDD (Time Division Duplex) and it provides control signalling, mobility and user data while the secondary carrier(s) 31' use unlicensed spectrum with best-effort user data in DL. UL data can also be supported by the secondary carrier 31'. Hence, the unlicensed band may be used as a bi-directional communication channel or downlink only (SDL) mode. The secondary carrier 31' may utilise LTE FDD (Frequency Division Duplex) and/or TDD (Time Division Duplex).

UL and DL carriers are illustrated to different frequencies in the FIG. 2, but these may optionally share one radio channel.

MuLTEfire system and future 3GPP releases for LTE LAA operation will operate without primary cell 31. In this kind of operation, both UL and DL carriers shown in 31' are used for communication purposes at unlicensed band. When the transmission and the reception occur at the unlicensed band, both the network node 1 and wireless device transmit at the unlicensed frequency band and both devices need use listen before talk procedure prior the transmission.

Figure 3A:
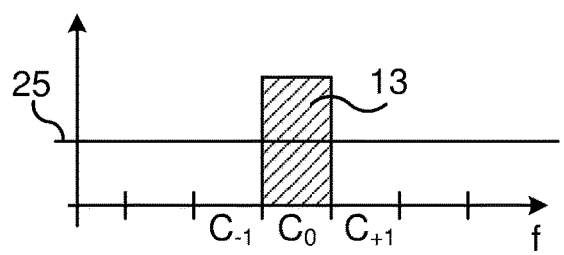
FIGS. 3A-B are schematic graphs illustrating the listen before talk procedure.
Figure 3B:
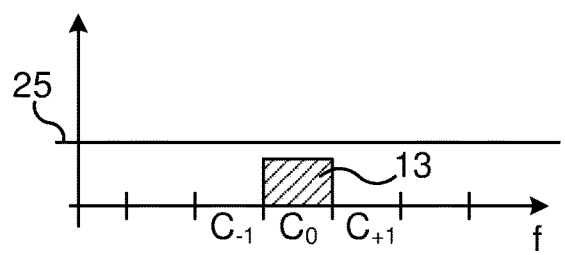

FIGS. 3A-B are schematic graphs illustrating the listen before talk procedure from a perspective of a transceiver device intending to transmit. Here, the horizontal axis represents frequency (or radio channels) and the vertical axis represents signal level. The horizontal axis is divided into radio channels. Each radio channel corresponds to a frequency interval used for radio transmissions. The radio channel is defined for LTE-LAA but often coincides with radio channels defined for IEEE 802.11x. $C_0$ represents a candidate radio channel. $C_{-1}$ represents a lower adjacent radio channel being adjacent to the candidate radio channel $C_0$, where the lower radio channel is on a lower frequency than the candidate radio channel $C_0$. $C_{+1}$ represents a higher adjacent radio channel being adjacent to the candidate radio channel $C_0$, where the higher adjacent radio channel is on a higher frequency than the candidate radio channel $C_0$. Transmission is intended to be performed on the candidate radio channel $C_0$ in a candidate period, whereby the radio environment needs to be analysed first.

Looking now first to FIG. 3A, there is here a signal 13 on the candidate radio channel $C_0$. The source of the signal 13 can be another transmitter, which can be of a different radio access technology (such as WiFi) or the same type of radio access technology. A first threshold 25 is used to determine whether the radio channel is to be considered busy. In this case, the signal level of the signal 13 is higher than the first threshold 25. Hence, according to the listen before talk procedure, the transmitter determines that the candidate radio channel $C_0$ is busy, and the transmitter refrains from transmitting on the candidate radio channel $C_0$ in the candidate period. The procedure is repeated for the next candidate period, at which point the same or other radio channel can be a candidate radio channel $C_0$.

Looking now to FIG. 3B, there is a signal 13 on the candidate radio channel $C_0$. In this case, the signal level of the signal 13 is lower than the first threshold 25. Hence, according to the listen before talk procedure, the transmitter determines that the candidate radio channel $C_0$ is free for transmissions, and the transmitter can proceed and transmit on the candidate radio channel $C_0$ in the candidate period. Again, the procedure can be repeated for the next candidate period, at which point the same or other radio channel can be a candidate radio channel $C_0$.

Figure 4A:
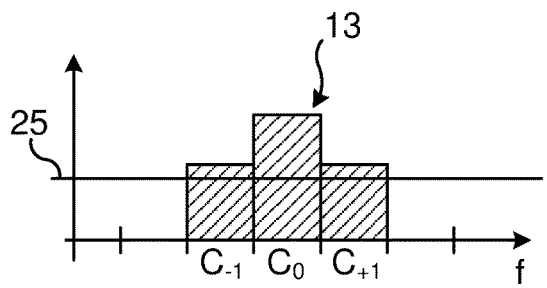
FIGS. 4A-C are schematic graphs illustrating embodiments of the listen before talk procedure.
Figure 4B:
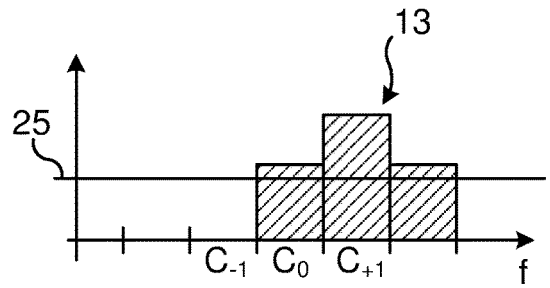
Figure 4C:
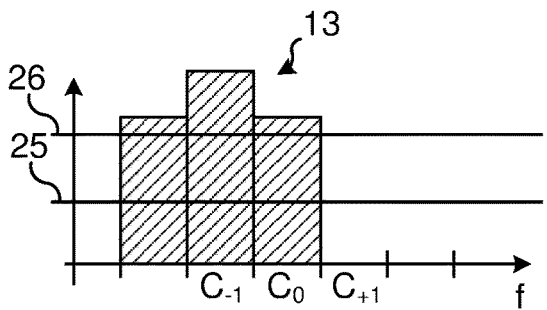

FIGS. 4A-C are schematic graphs illustrating embodiments of the listen before talk procedure. The graphs are similar to the graphs of FIGS. 3A-B but the signals are different.

Looking first to FIG. 4A, the signal 13 here has a main component at the candidate radio channel $C_0$, with side components on the lower adjacent radio channel $C_{-1}$ and the higher adjacent radio channel $C_{+1}$. In accordance with the listen before talk procedure, the signal level of the signal 13 is higher than the first threshold on the candidate radio channel $C_0$, whereby the transmitter refrains from transmitting on the candidate radio channel $C_0$ in the candidate period.

Looking now to FIG. 4B, the scenario is similar to the scenario of FIG. 4B, but here the main component of the signal 13 at the higher adjacent radio channel. The lower side component of the signal 13 is at the candidate radio channel $C_0$, with a signal strength which is above the first threshold level 25. Hence, in the prior art, according to the listen before talk procedure, the transmitter would not transmit. However, since the signal effect on the candidate radio channel $C_0$ is only a side component, transmissions could still occur while not being on the same carrier channel as another transmission.

Hence, according to embodiments presented herein, when there is a signal level on the candidate radio channel $C_0$ which is higher than the first threshold, the transceiver device checks at least one adjacent radio channel.

If the signal level is higher on the adjacent radio channel, then the candidate radio channel $C_0$ is considered to be free and the transmission on the candidate radio channel $C_0$ proceeds. This prevents the transmitter from determining that the candidate radio channel $C_0$ is blocked when it is just a side component of a transmission on an adjacent radio channel.

FIG. 4C illustrates a scenario where the signal 13 has its main component on the lower adjacent radio channel $C_{-1}$. Here however, the upper side component of the signal 13 is higher than a second threshold 26. The second threshold 26 is used such that any signal greater the second threshold 26 on the candidate radio channel $C_0$ is too high, even when an adjacent channel signal is higher. Hence, in the scenario of FIG. 4C, the transmitter would refrain from transmitting on the candidate radio channel $C_0$ in the candidate period.

Figure 5A:
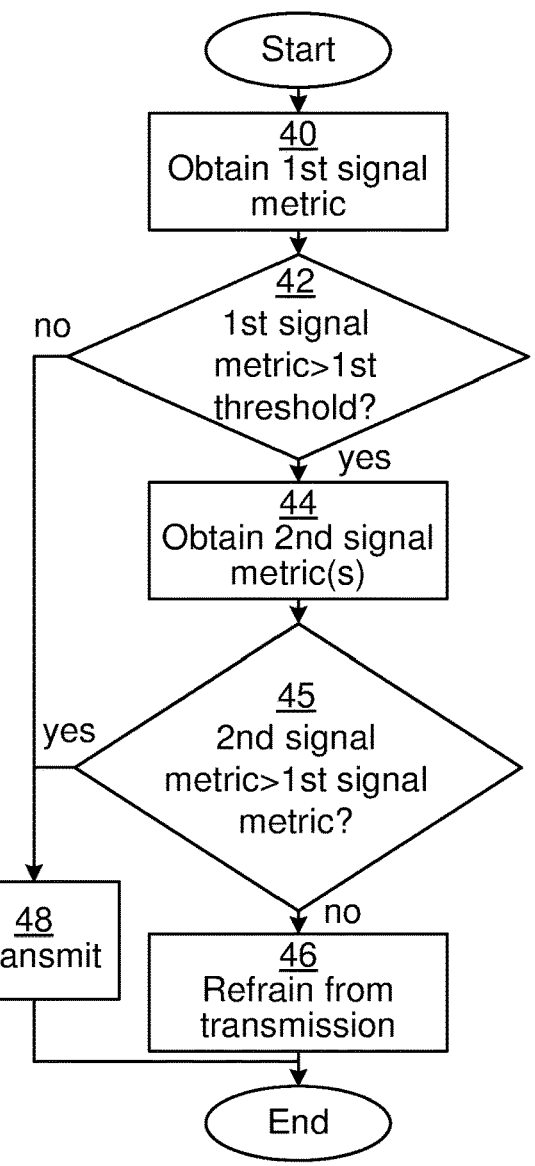
FIGS. 5A-C are flow charts illustrating embodiments of methods for determining whether to transmit data on a candidate radio channel.
Figure 5B:
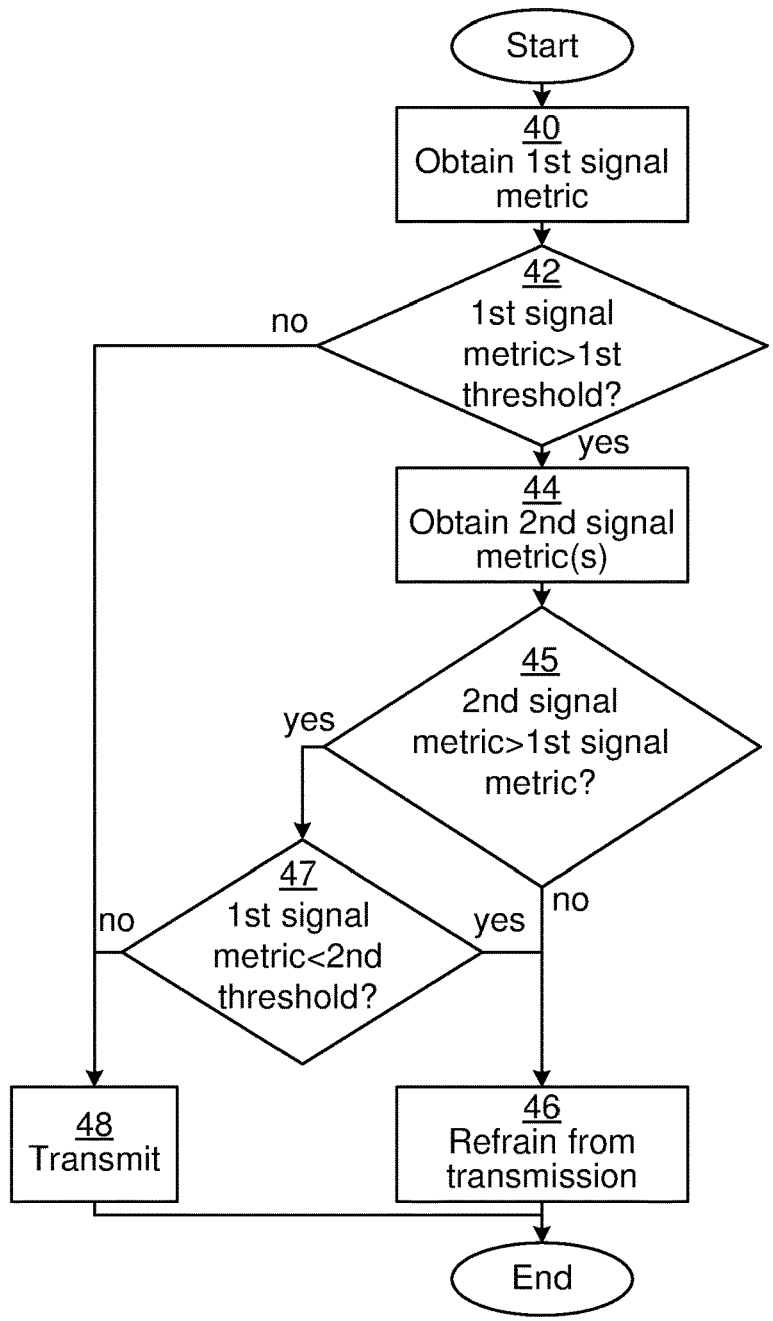
Figure 5C:
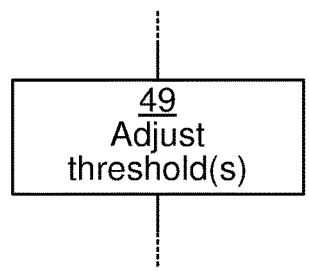

FIGS. 5A-C are flow charts illustrating embodiments of methods for determining whether to initiate transmission of data on a candidate radio channel during a candidate period. First, embodiments of the method of FIG. 5A will be described. The radio channel can be a radio channel according to Long Term Evolution Licence Assisted Access, LTE-LAA, as defined in 3GPP Release 13 or any other suitable radio channel.

In an obtain $1^{st}$ signal metric step 40 a first signal metric is obtained. The first signal metric indicates a signal level of the candidate radio channel ($C_0$ of FIGS. 4A-C). The first metric can be obtained by measuring signal levels in the radio environment (illustrated in radio channel $C_0$ FIGS. 4A-C). The measuring can be performed by the transceiver device. Alternatively, the measuring is performed by an external node and reported to the transceiver device.

In a conditional $1^{st}$ signal metric>$1^{st}$ threshold step 42, it is determined whether the first signal metric indicates a signal level being greater than a first threshold (25 of FIGS. 4A-C). If this is the case, the method proceeds to an obtain $2^{nd}$ signal metric step 44. Otherwise, the method proceeds to a transmit step 48 (since we are below the threshold whereby transmissions are acceptable).

In the obtain $2^{nd}$ signal metric(s) step 44, a second signal metric is obtained. The second signal metric indicates a signal level of at least one adjacent radio channel ($C_{-1}$ or $C_{+1}$ of FIGS. 4A-C), being adjacent in frequency to the candidate radio channel. The second metric can be obtained by measuring signal levels in the radio environment (illustrated in radio channel $C_0$ FIGS. 4A-C). The measuring can be performed by the transceiver device. Alternatively, the measuring is performed by an external node and reported to the transceiver device.

This step may comprise obtaining the second signal metric indicating a signal level of a two adjacent radio channels (i.e. both $C_{-1}$ or $C_{+1}$ of FIGS. 4A-4C) being adjacent in frequency on either side of the candidate radio channel.

In a conditional $2^{nd}$ signal metric>$1^{st}$ signal metric 45, it is determined if the second signal metric indicates a higher signal level than the first signal metric. If this is the case, the method proceeds to the transmit step 48. Otherwise, the method proceeds to a refrain from transmission step 46.

In the transmit step 48, data transmission on the candidate radio channel in the candidate period is initiated. The transmission may be performed by the transceiver device itself of by another device controlled by the transceiver device.

In the refrain from transmission step 46, the transceiver device refrains from initiating transmission on the candidate radio channel in the candidate period. This step does not need to imply any action from the transceiver device; it may merely be absence of performing the transmit step 48.

In the two obtaining steps 40, 44, the first signal metric and the second signal metric are optionally based on radio measurements performed at essentially the same time. Optionally, each one of the first signal metric and the second signal metric is an average of several individual measurements, to thereby reduce the effect of temporary spikes.

This method provides a great improvement over the prior art. The LBT functionality is improved when adjacent radio channel interference is present, since the LBT function in the prior art e.g. implemented in WiFi, assumes only same radio channel inference. This may be true with WiFi, since WiFi system do no use adjacent or alternate radio channels at all, but 3GPP systems using LTE LAA or standalone version of LTE like MuLTEfire or future LTE LAA will use adjacent radio channels, whereby this method will radically improve throughput.

Moreover, spectrum usage with LTE LAA or MuLTEfire system is improved, since a radio channel adjacent to a radio channel being used for WiFi and/or LTE LAA or MuLTEfire transmissions may be used when a source of interference is analysed.

When analysis of adjacent radio channels is done to identify the source of the signal/interference on the operational radio channel, then false blocked radio channel detection by LBT algorithm can be avoided. This will enhance the performance of the LBT and LTE LAA or MuLTEfire system.

Looking now to FIG. 5B, only new or modified steps compared to FIG. 5A will be described.

Here, in the conditional $2^{nd}$ signal metric>$1^{st}$ signal metric step 45, if the second signal metric indicates a higher signal level than the first signal metric, the method proceeds to an optional conditional $1^{st}$ signal metric<$2^{nd}$ threshold step 47.

In the optional conditional $1^{st}$ signal metric<$2^{nd}$ threshold step 47, it is determined if the first signal metric indicates a signal level being lower than a second threshold (26 of FIG. 4A-4C). The second threshold is higher than the first threshold. If this is the case (e.g. as in FIG. 4C), the method proceeds to the refrain from transmission step 46. Otherwise (e.g. as in FIG. 4B), the method proceeds to the transmit step 48. Alternatively or additionally, the second signal metric could be compared with the second threshold.

Looking now to FIG. 5C, it is shown embodiments of methods which can be executed in parallel to other steps.

In an adjust threshold(s) step 49, the first threshold is adjusted over time based on changing signal levels. This can comprise also adjusting the second threshold over time based on changing signal levels. The adjusting can be based on detecting details of a radio access technology (e.g. WiFi, LTE-LAA, MuLTEfire etc.) used for transmission on the at least one adjacent radio channel.

It is to be noted that when comparisons are made e.g. in steps 42, 45 and 47, it is not important what happens when the two compared values are exactly the same, as long as the outcome is predetermined.

Figure 6:
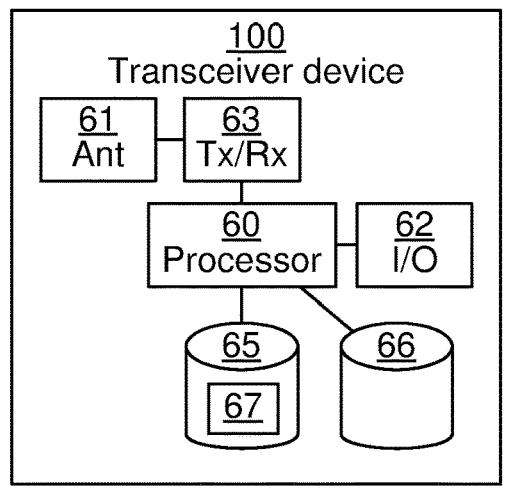
FIG. 6 is a schematic diagram illustrating components of the transceiver device of FIG. 1.

FIG. 6 is a schematic diagram illustrating components the any one of the transceiver devices 100 of FIG. 1, here represented by a single transceiver device. It is to be noted that one or more of the mentioned components can be shared with the host device (e.g. the wireless device or the network node).

A processor 60 is provided using any combination of one or more of a suitable central processing unit (CPU), multi-processor, microcontroller, digital signal processor (DSP), application specific integrated circuit etc., capable of executing software instructions 67 stored in a memory 65, which can thus be a computer program product. The processor 60 can be configured to execute the method described with reference to FIGS. 5A-C above.

The memory 65 can be any combination of read and write memory (RAM) and read only memory (ROM). The memory 65 also comprises persistent storage, which, for example, can be any single one or combination of magnetic memory, optical memory, solid state memory or even remotely mounted memory.

A data memory 66 is also provided for reading and/or storing data during execution of software instructions in the processor 60. The data memory 66 can be any combination of read and write memory (RAM) and read only memory (ROM).

The transceiver device further comprises an I/O interface 62 for communicating with other external entities. Optionally, the I/O interface 62 also includes a user interface.

Optionally, the transceiver device 100 comprises its own transceiver 63 comprising suitable analogue and digital components to allow signal transmission and signal reception with a wireless device using one or more antennas 61. Optionally, the transceiver device 100 controls another device comprising a transmitter and/or receiver.

Other components of the transceiver device are omitted in order not to obscure the concepts presented herein.

Figure 7:
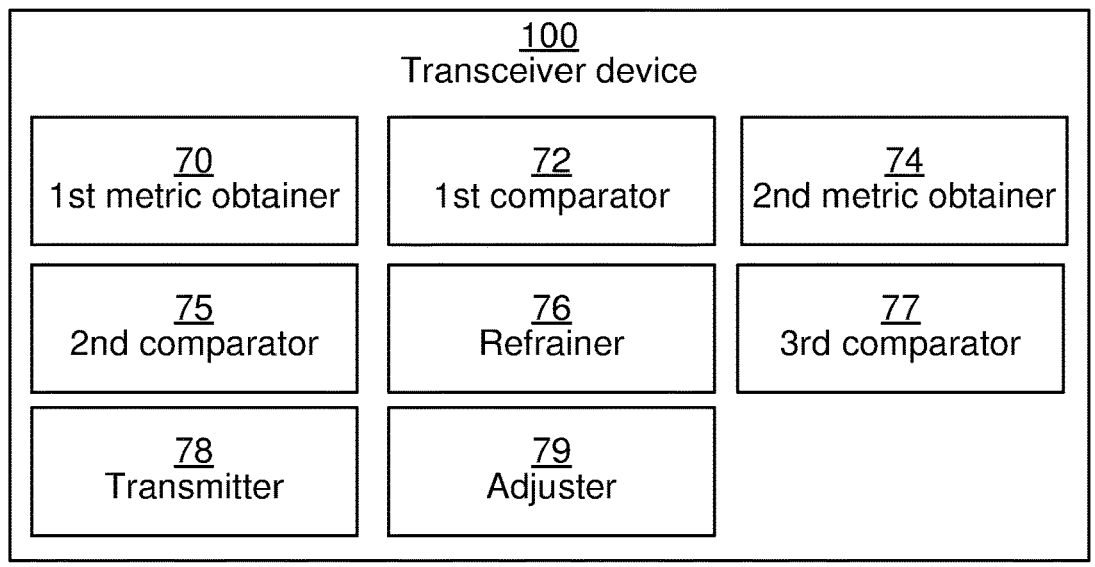
FIG. 7 is a schematic diagram showing functional modules of the transceiver device of FIG. 6 according to one embodiment.

FIG. 7 is a schematic diagram showing functional modules of the transceiver device 100 of FIG. 6 according to one embodiment. The modules are implemented using software instructions such as a computer program executing in the transceiver device. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 5A to 5C.

A $1^{st}$ metric obtainer 70 corresponds to step 40. A $1^{st}$ comparator 72 corresponds to step 42. A $2^{nd}$ metric obtainer 74 corresponds to step 44. A $2^{nd}$ comparator 75 corresponds to step 45. A refrainer 76 corresponds to step 46. A $3^{rd}$ comparator 77 corresponds to step 47. A transmitter 78 corresponds to step 48. An adjuster 79 corresponds to step 49.

Figure 8:
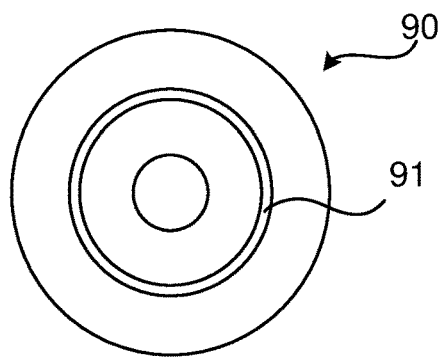
FIG. 8 shows one example of a computer program product comprising computer readable means.

FIG. 8 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 65 of FIG. 6. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for determining whether to initiate transmission of data on a candidate radio channel during a candidate period, the method being performed in a transceiver device of a cellular network and comprising the steps of:
   obtaining a first signal metric indicating a signal level of the candidate radio channel;
   determining that the first signal metric indicates a signal level being greater than a first signal level threshold;
   obtaining a second signal metric indicating a signal level of at least one adjacent radio channel, being adjacent in frequency of the candidate radio channel;
   determining that the first signal metric and the second signal metric are lower than a second signal level threshold, the second signal level threshold being higher than the first signal level threshold;
   refraining from initiating transmission on the candidate radio channel in the candidate period in response to the second signal metric indicating a lower signal level than the first signal metric; and
   initiating transmission of data on the candidate radio channel in the candidate period in response to the second signal metric indicating a higher signal level than the first signal metric and the first signal metric and the second signal metric are lower than the second signal level threshold.

2. The method according to claim 1, further comprising the step of:
   adjusting the first signal level threshold over time based on changing signal levels.

3. The method according to claim 1, further comprising adjusting the second signal level threshold over time based on changing signal levels.

4. The method according to claim 2, wherein the step of adjusting further comprises adjusting based on detecting details of a radio access technology used for transmission on the at least one adjacent radio channel.

5. The method according to claim 1 wherein the step of obtaining a second signal metric further comprises obtaining the second signal metric indicating a signal level of a two adjacent radio channels being adjacent in frequency on either side of the candidate radio channel.

6. The method according to claim 1, wherein the radio channel is a radio channel according to Long Term Evolution Licence Assisted Access, LTE-LAA, as defined in 3GPP Release 13.

7. The method according to claim 1, wherein each one of the first signal metric and the second signal metric is an average of several individual measurements.

8. The method according to claim 1, wherein the step of obtaining a first signal metric and the step of obtaining a second signal metric are based on measurements performed at the same time.

9. A transceiver device for determining whether to initiate transmission of data on a candidate radio channel during a candidate period, the transceiver device being arranged to form part of a cellular network and comprising:
a processor; and
a memory storing instructions that, when executed by the processor, causes the transceiver device to:
obtain a first signal metric indicating a signal level of the candidate radio channel;
determine that the first signal metric indicates a signal level being greater than a first signal level threshold;
obtain a second signal metric indicating a signal level of at least one adjacent radio channel, being adjacent in frequency to the candidate radio channel;
determine that the first signal metric and the second signal metric are lower than a second signal level threshold, the second signal level threshold being higher than the first signal level threshold;
refrain from initiating transmission on the candidate radio channel in the candidate period when the second signal metric indicates a lower signal level than the first signal metric; and
initiate transmission of data on the candidate radio channel in the candidate period when the second signal metric indicates a higher signal level than the first signal metric and the first signal metric and the second signal metric are lower than the second signal level threshold.

10. The transceiver device according to claim 9, further comprising instructions that, when executed by the processor, causes the transceiver device to: adjust the first signal level threshold over time based on changing signal levels.

11. The transceiver device according to claim 9, wherein the instructions to adjust further comprise instructions that, when executed by the processor, causes the transceiver device to adjust the second signal level threshold over time based on changing signal levels.

12. The transceiver device according to claim 9, wherein the instructions to obtain a second signal metric further comprise instructions that, when executed by the processor, causes the transceiver device to obtain the second signal metric indicating a signal level of a two adjacent radio channels being adjacent in frequency on either side of the candidate radio channel.

13. The transceiver device according to claim 9, wherein the radio channel is a radio channel according to Long Term Evolution Licence Assisted Access, LTE-LAA, as defined in 3GPP Release 13.

14. The transceiver device according to claim 9, wherein each one of the first signal metric and the second signal metric is an average of several individual measurements.

15. The transceiver device according to claim 9, further comprising instructions to perform the instructions to obtain a first signal metric and to obtain a second signal metric at the same time.

16. A transceiver device comprising:
means for obtaining a first signal metric indicating a signal level of a candidate radio channel;
means for determining that the first signal metric indicates a signal level being greater than a first signal level threshold;
means for obtaining a second signal metric indicating a signal level of at least one adjacent radio channel, being adjacent in frequency to the candidate radio channel;
means for determining that the first signal metric and the second signal metric are lower than a second signal level threshold, the second signal level threshold being higher than the first signal level threshold;
means for refraining from initiating transmission on the candidate radio channel in a candidate period when the second signal metric indicates a lower signal level than the first signal metric; and
means for initiating transmission of data on the candidate radio channel in the candidate period when the second signal metric indicates a higher signal level than the first signal metric and the first signal metric and the second signal metric are lower than the second signal level threshold.

17. A computer readable non-transitory storage medium storing a computer program which, when executed on at least one processor, causes the at least one processor to determine whether to initiate transmission of data on a candidate radio channel during a candidate period, the computer program comprising computer program code which, when run on a transceiver device being part of a cellular network causes the transceiver device to:
obtain a first signal metric indicating a signal level of the candidate radio channel;
determine that the first signal metric indicates a signal level being greater than a first signal level threshold;
obtain a second signal metric indicating a signal level of at least one adjacent radio channel, being adjacent in frequency to the candidate radio channel;
determine that the first signal metric and the second signal metric are lower than a second signal level threshold, the second signal level threshold being hi her than the first signal level threshold;
refrain from initiating transmission on the candidate radio channel in the candidate period when the second signal metric indicates a lower signal level than the first signal metric; and
initiating transmission of data on the candidate radio channel in the candidate period when the second signal metric indicates a higher signal level than the first signal metric and the first signal metric and the second signal metric are lower than the second signal level threshold.

18. A computer program product comprising a computer readable non-transitory storage medium storing a computer program according to claim 17.

* * * * *